United States Patent
Davis et al.

(10) Patent No.: US 6,554,427 B1
(45) Date of Patent: Apr. 29, 2003

(54) METHODS FOR DESIGNING CONTACT LENSES

(75) Inventors: Brett A. Davis, Cooparoo (AU); Jeffrey H. Roffman, Jacksonville, FL (US); Michael J. Collins, Mt. Nebo (AU); Daoud R. Iskander, Hawthorne (AU)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/015,156

(22) Filed: Dec. 11, 2001

(51) Int. Cl.$^7$ ................................. G02C 7/04
(52) U.S. Cl. ................... 351/177; 351/160 R
(58) Field of Search .............. 351/160 R, 160 H, 351/161, 162, 177

(56) References Cited

U.S. PATENT DOCUMENTS

| | | | |
|---|---|---|---|
| 4,503,493 A | 3/1985 | Burkhardt et al. | |
| 5,287,441 A | 2/1994 | Nakamura | |
| 5,452,031 A | 9/1995 | Ducharme | |
| 5,815,236 A | 9/1998 | Vayntraub | |
| 5,815,237 A | 9/1998 | Vayntraub | |
| 5,880,809 A | 3/1999 | Lieberman et al. | |
| 5,975,694 A | 11/1999 | Vayntraub | |
| 6,241,355 B1 * | 6/2001 | Barsky | 351/177 |
| 6,305,800 B1 | 10/2001 | Miller et al. | |

* cited by examiner

*Primary Examiner*—Scott J. Sugarman
(74) *Attorney, Agent, or Firm*—Lois Gianneschi

(57) ABSTRACT

The invention provides a method for designing lenses and lenses produced thereby in which method locally fitted Chebyshev polynomials are used to design one or more of the lens' surfaces.

19 Claims, 1 Drawing Sheet

METHODS FOR DESIGNING CONTACT LENSES

FIELD OF THE INVENTION

The present invention relates to ophthalmic lenses. In particular, the invention provides lenses with surfaces designed using Chebyshev polynomials.

BACKGROUND OF THE INVENTION

The use of ophthalmic lenses including, without limitation, contact lenses for the correction of ametropia is well known. A number of known methods exist for approximating the shape of the lens' surface. For example, it is known to use splines, sine and cosine functions, exponential functions and logarithmic functions to define all or a part of a lens surface. However, the use of splines is disadvantageous in that some spline functions can become unconstrained at their outermost points resulting in oscillations between points. The other functions are problematic in that the ability to approximate a surface is limited by the equation used. Therefore, a need exists for a fitting method that overcomes some or all of these disadvantages.

DESCRIPTION OF THE INVENTION AND ITS PREFERRED EMBODIMENTS

Figure 1:
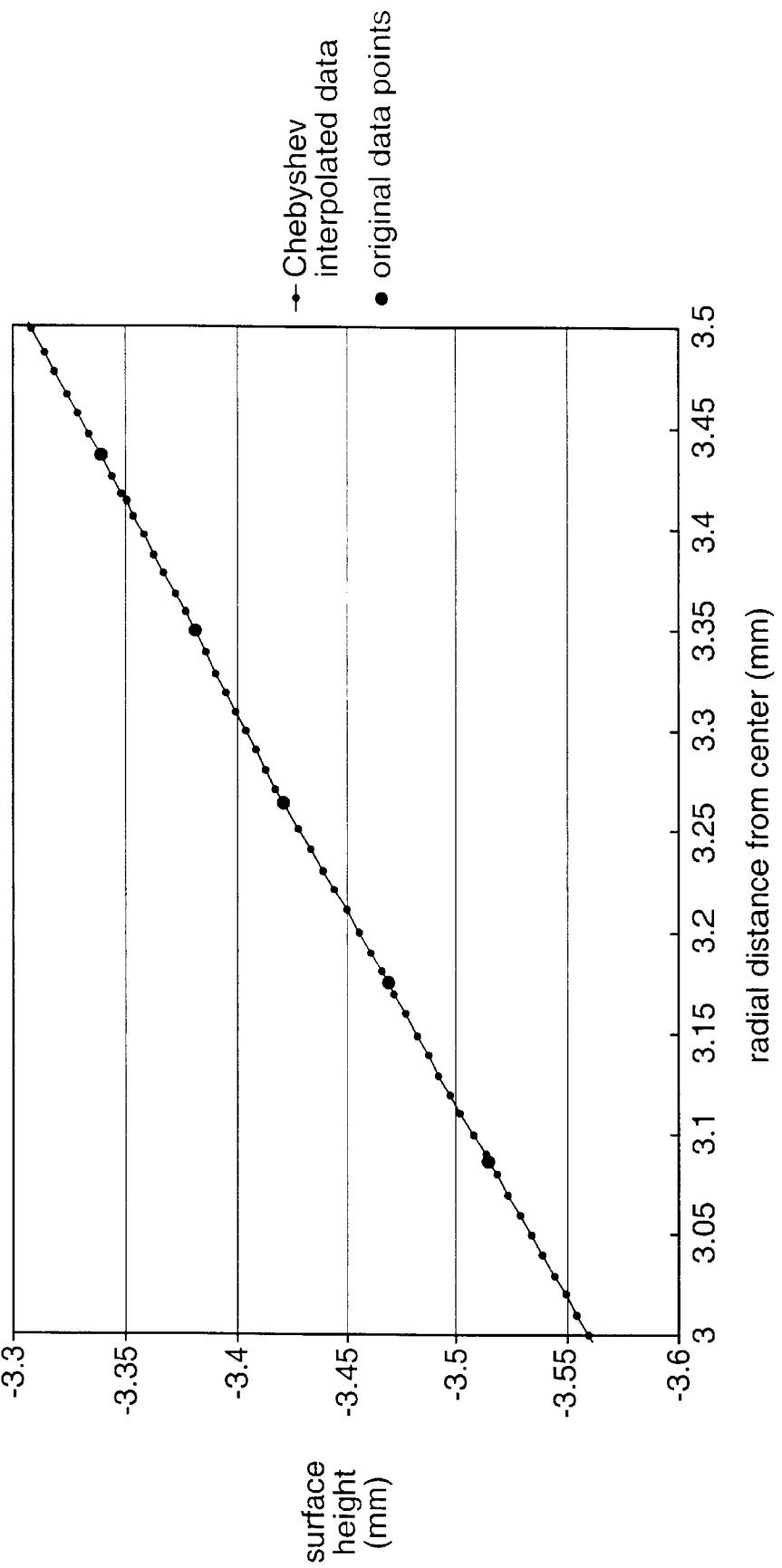
FIG. 1 is a diagrammatic view of a set of original data points and points interpolated using piece-wise, third order Chebyshev polynomials and four point fits.

The present invention provides a method for designing lenses, and lenses produced thereby, in which locally fitted Chebyshev polynomials are used to design one or more of the lens' surfaces. The method provides a flexible technique for surface design that is limited only by the original surface shape, the sampling of the surface, and the order of the required fit.

In one embodiment, the invention provides a method for designing a lens surface comprising, consisting essentially of, and consisting of using a polynomial of the following equation:

$T[1]=l,$ $T[2]=x,$ $T[j]=2x.T[j-1]-T[j-2]$ wherein j is the order of the polynomial+1 and x is a spatial dimension.

For purposes of the invention, by "lens" or "lenses" is meant any ophthalmic lens including, without limitation, spectacle lenses, contact lenses, intraocular lenses and the like. The term "fitting" means using an equation or equations to approximate the shape of the lens surface desired, the tool surface from which the lens surface will be produced, or both.

Chebyshev polynomials are a set of orthogonal functions, each function being independent of all other functions. Surfaces made up of discrete points, rather than equations, may be represented using piece-wise Chebyshev polynomials of a suitable order and in any direction, or using Chebyshev polynomials to fit each of a number of sections of the surface. For example, one section of a surface may be fitted using a Chebyshev polynomial and then the range of the fit is shifted and another section is fitted, rather than fitting a single function to the entire data set for the surface. Any of a number of methods may be used to determine the order of the Chebyshev polynomial to be used. For example, the fit may approximate the surface shape to a selected tolerance, may be arbitrarily selected, or may be of a simple relationship, such as the order of fit equaling the number of points+1. Generally, a rapidly varying surface shape will require a higher order fit than a smoothly changing surface. Preferably, a third order polynomial is used.

In the method of the invention, the polynomial used is:

$T[1]=l,$ $T[2]=x,$ $T[j]=2x.T[j-1]-T[j-2]$ wherein j is the order of the polynomial+1 and x is a spatial dimension. The spatial dimension used may be any desired dimension including, without limitation, a distance from the center of the surface, a distance in any direction, an x or y coordinate in a Cartesian coordinate system, or the like. Preferably, x is the radial distance from the center in polar coordinates.

Although, the method for producing and designing the lenses of the invention may be used to design any lens, the invention may find its greatest utility in the design of contact lenses. The design process of the invention begins with a description of an original surface shape by any method known in the art. Useful equations for describing the surface include, without limitation, conics, spheres, Zernike polynomials and the like, and combinations thereof The surface then may be converted into a set of discrete points representing the surface by using the desired point locations to generate the heights of the surface. Alternatively, the surface may be described by reading discrete points from a data file. For example for a back, or eye side, surface of a lens, corneal topographic data may be used to provide a set of discrete points for the surface.

The surface is then divided into any number of desired sections. The number of sections, or zones used, may be determined based on the order of the fitting polynomial and the number of discrete points used in the surface description. Subsequently, the geometry of each section is defined in terms of a Chebyshev polynomial. The original surface may be divided into 2- or 3-dimensional sections based on the type of surface to be approximated and the manufacturing method to be used.

A Chebyshev polynomial is fitted to each of the sections to determine the coefficients used for approximating the original surface shape in the section. These coefficients may be computed by any known method, such as by using commercially available, optical design software. Preferably, the coefficients are estimated using a linear least squares approach using the following equation:

$$f(x) = \sum_{j=1}^{n} a[j]T[j]$$

wherein a[j] are coefficients of the Chebyshev polynomial T[j] and n is the number of coefficients. One ordinarily skilled in the art will recognize that the coefficients may be transformed to another set of basis functions, for example such as $y=a+bx+cx^2+dx^3$, for ease in use.

The coefficients may be stored for later use or used directly for interpolating new data points in the section. In interpolating new points, preferably the points are only interpolated from the central portion of each section. For example, in a four point fit, or a fit performed using four points in the section, new data points are interpolated from between points 2 and 3.

However, new data points may be interpolated from any portion of the section if required, such as the beginning and end of the data sets when the fit region cannot be shifted. The beginning and end of the local fit section is shifted and another fit is performed. The amount of shift for a section is typically 1 point thus providing 3 overlapping points for adjacent 4 point fit sections. However, the overlapping may be altered from 1 point to n−1 points to provide a 1, 2, or 3 point overlap for a 4 point fit section.

In FIG. 1 is shown a diagrammatic view of a set of original data points and points interpolated using piece-wise, third order Chebyshev polynomials and four point fits. Topographic data was used for the set of discrete points and a third order polynomial was used for each of the sections.

The ability to change the order of the Chebyshev fit used for each section of the surface, along with the amount of overlap for adjacent fits and the portion of the fit section from which new points are estimated make the method of the invention an extremely flexible method of approximating the original surface shape. Additionally, the method of the invention provides decreased errors in approximation of the lens surface.

The invention will be clarified further by a consideration of the following, non-limiting examples.

What is claimed is:

1. A method for designing a lens surface, comprising using a polynomial of the equation:

$$T[1]=l,$$

$$T[2]=x,$$

$$T[j]=2x.T[j-1]-T[j-2]$$

wherein j is the order of the polynomial+1 and x is a spatial dimension.

2. The method of claim 1, wherein the spatial dimension is a distance from the center of the surface, a distance in any direction, or an x or y coordinate in a cartesian coordinate system.

3. The method of claim 1, wherein the spatial distance is a radial distance from the center of the surface in polar coordinates.

4. The method of claim 1, wherein the lens is a contact lens.

5. The method of claim 4, further comprising the steps of:
 a.) describing an original shape for the lens surface;
 b.) converting the surface into at least one set of discrete points;
 c.) dividing the surface into a plurality of sections; and
 d.) computing the coefficients of the polynomial that approximate the original shape for the surface of each of the plurality of sections.

6. The method of claim 5, further comprising e.) interpolating at least one data point using the computed coefficients, wherein the at least one point is in addition to the set of discrete points.

7. The method of claim 4, further comprising the steps of:
 a.) obtaining a data file comprising a set of discrete points for describing the surface;
 b.) reading discrete points from the data file;
 c.) dividing the surface into a plurality of sections; and
 d.) computing the coefficients of the polynomial that approximate the original shape for the surface of each of the plurality of sections.

8. The method of claim 7, further comprising e.) interpolating at least one data point using the computed coefficients, wherein the at least one point is in addition to the set of discrete points.

9. The method of claim 7, wherein the data file is a corneal topographic data file.

10. The method of claim 8, wherein the data file is a corneal topographic data file.

11. A lens designed according to the method of claim 1.
12. A lens designed according to the method of claim 3.
13. A lens designed according to the method of claim 4.
14. A lens designed according to the method of claim 5.
15. A lens designed according to the method of claim 6.
16. A lens designed according to the method of claim 7.
17. A lens designed according to the method of claim 8.
18. A lens designed according to the method of claim 9.
19. A lens designed according to the method of claim 10.

* * * * *